Patented May 3, 1938

2,116,333

UNITED STATES PATENT OFFICE 2,116,333

PRESERVATION OF RUBBER

Ira Williams, Woodstown, and William A. Douglass, Penns Grove, N. J., and Arthur Morrill Neal, Wilmington, Del., assignors to E. I. du Pont de Nemours & Company, Wilmington, Del., a corporation of Delaware No Drawing. Application October 25, 1932, Serial No. 639,478

26 Claims. (Cl. 18—50)

This invention relates to the preservation of rubber and more particularly to the incorporation of compounds which retard that deterioration which is due to the action of heat and oxidation.

It is well known that many materials possess the property, when incorporated in rubber, of retarding that deterioration which rubber normally undergoes when exposed to the action of heat and oxidation. Among the earliest types of compounds employed for this purpose were the naphthalene diamines such as 1-8-naphthalene diamine, as disclosed in U. S. Patent 1,532,398. The importance of this class of compounds is lessened, however, by the fact that they are relatively toxic and also because of their activating effect on many of the common accelerators used in practice.

An object of the present invention is to provide vulcanized rubber having improved age-resisting properties. A further object is to incorporate in rubber a new class of compounds having exceptional preserving properties which are non-toxic and in general have no effect on the rate of cure when incorporated into rubber prior to vulcanization. Other objects are to provide new compositions of matter and to advance the art. Still other objects will appear hereinafter.

These objects may be accomplished in accordance with our invention which comprises incorporating into rubber, before or after vulcanization thereof, compounds of the type:

$$R-\underset{H}{\overset{|}{N}}-A-\underset{H}{\overset{|}{N}}-R'$$

in which A represents a naphthalene nucleus and R and R' represent the same or different members of the group comprising alkyl, aralkyl and aryl groups. The aryl nucleus may contain one or more hydroxy, alkyl or alkoxy groups. The term "aralkyl" as employed herein is to be understood to mean an alkyl group having at least one hydrogen substituted by an aryl nucleus.

Among the compounds of this class which we have found to be particularly satisfactory for our purpose are the following:

2:7-diphenyl naphthalene diamine

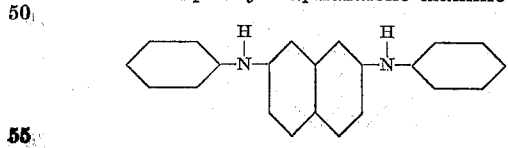

2:7-di-p-phenetyl naphthalene diamine

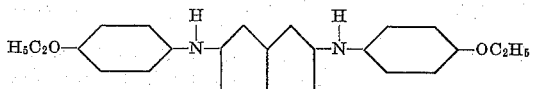

1:5-diphenyl naphthalene diamine

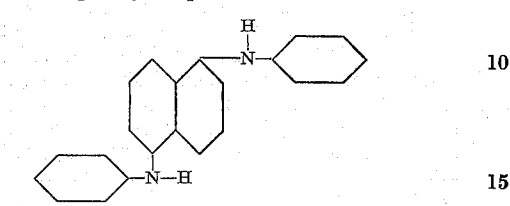

1:8-diphenyl naphthalene diamine

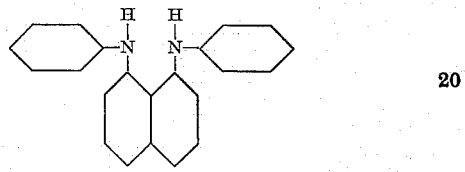

1-phenyl-4-p-phenetyl naphthalene diamine

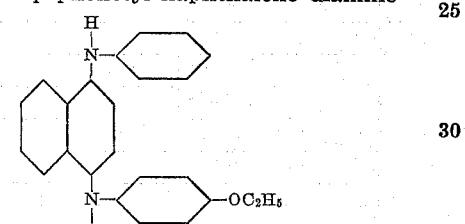

1-phenyl-4-p(OH)-phenyl naphthalene diamine

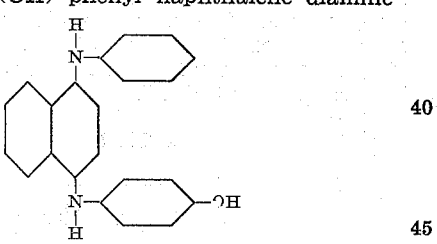

1:5-di-p(OH)-phenyl naphthalene diamine

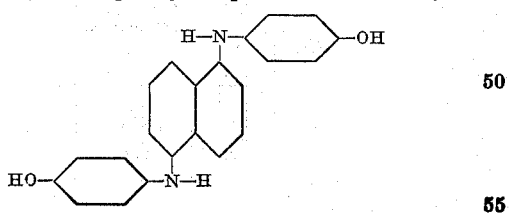

1:5-dibutyl naphthalene diamine

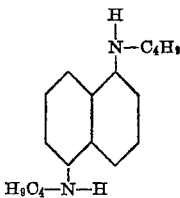

In order to test this class of compounds the two following stocks were prepared:

|  | A | B |
|---|---|---|
| Pale crepe | 100.0 | 100.0 |
| Zinc oxide | 3.0 | 3.0 |
| Titanox* | 50.0 | 50.0 |
| Sulfur | 2.0 | 2.0 |
| Tetra methyl thiuram mono sulfide | 0.2 | 0.2 |
| 1:5-di-p(OH) phenyl amido naphthalene |  | 1.0 |

*Titanox is the trade name of a mixture of 75% barium sulfate and 25% titanium dioxide. (Gardner *Chemical Synonyms and Trade Names* 3d Ed. 1930 p. 328.)

These stocks were cured to comparable states of cure at 20 lbs. steam pressure. Their relative aging properties were determined by suspending samples in a Bierer Davis bomb at 70° C. and 300 lbs. oxygen pressure. After 7 days under these conditions stock A was completely deteriorated, whereas stock B, containing the deterioration inhibitor, was still in good condition after 17 days, when the test was discontinued.

In order to test this class of compounds still further, the following stocks were prepared:

|  | A | B | C | D | E | F | G | H | I |
|---|---|---|---|---|---|---|---|---|---|
| Pale crepe | 100 | 100 | 100 | 100 | 100 | 100 | 100 | 100 | 100 |
| Zinc oxide | 100 | 100 | 100 | 100 | 100 | 100 | 100 | 100 | 100 |
| Lithopone | 20 | 20 | 20 | 20 | 20 | 20 | 20 | 20 | 20 |
| Stearic acid | 1 | 1 | 1 | 1 | 1 | 1 | 1 | 1 | 1 |
| Sulfur | 3 | 3 | 3 | 3 | 3 | 3 | 3 | 3 | 3 |
| Diortho tolyl guanidine | .75 | .75 | .75 | .75 | .75 | .75 | .75 | .75 | .75 |
| 2:7-diphenyl naphthalene diamine |  | 1 |  |  |  |  |  |  |  |
| 2:7-di-p-phenetyl naphthalene diamine |  |  | 1 |  |  |  |  |  |  |
| 1:5-diphenyl naphthalene diamine |  |  |  | 1 |  |  |  |  |  |
| 1:8-diphenyl naphthalene diamine |  |  |  |  | 1 |  |  |  |  |
| 1-phenyl-4-p-phenetyl naphthalene diamine |  |  |  |  |  | 1 |  |  |  |
| 1-phenyl-4-p(OH) phenyl naphthalene diamine |  |  |  |  |  |  | 1 |  |  |
| 1:5-di-p(OH) phenyl naphthalene diamine |  |  |  |  |  |  |  | 1 |  |
| 1:5-dibutyl naphthalene diamine |  |  |  |  |  |  |  |  | 1 |

These stocks were vulcanized to a comparable state of cure at 40 lbs. steam pressure. Their aging properties were determined by suspending them in an oxygen bomb at 70° C. and 300 lbs. oxygen pressure for 48 hours. The results of this test are given in Table I.

*Table I*

| Stock | Original tensile | Tensile after aging |
|---|---|---|
| A. | 3050 | Completely deteriorated |
| B. | 2975 | 2500 |
| C. | 2975 | 2350 |
| D. | 3150 | 2350 |
| E. | 3025 | 2375 |
| F. | 2875 | 2625 |
| G. | 2900 | 2500 |
| H. | 3100 | 2300 |
| I. | 3225 | 2725 |

It will be seen from this table that the compounds of this class are very effective as inhibitors of that deterioration which rubber normally undergoes due to the action of heat and oxidation.

Other compounds of this same type which may be mentioned are:

1:2-di-p-tolyl naphthalene diamine

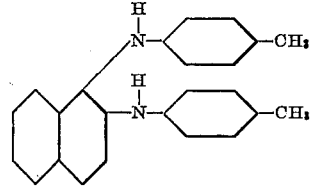

1:3-di-p-phenetyl naphthalene diamine

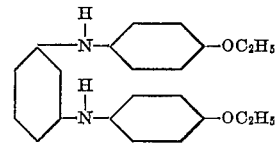

1:6-dibutyl naphthalene diamine

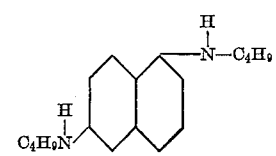

1:7-diphenyl naphthalene diamine

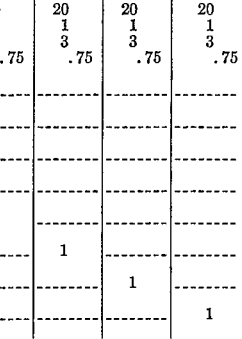

2:3-di-p-anisyl naphthalene diamine

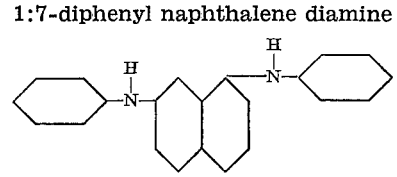

2:6-diethyl naphthalene diamine

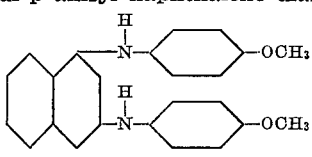

1-phenyl-5-p-anisyl naphthalene diamine

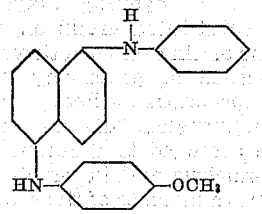

1-p-phenetyl-6-p-tolyl naphthalene diamine

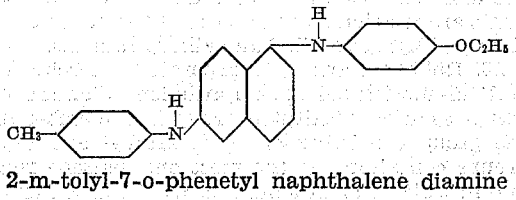

2-m-tolyl-7-o-phenetyl naphthalene diamine

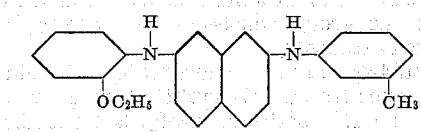

2-propyl-6-ethyl naphthalene diamine

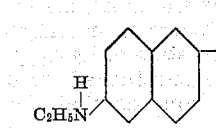

1-butyl-4-phenyl naphthalene diamine

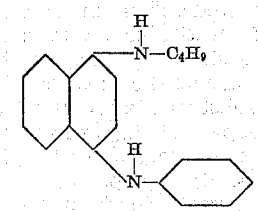

1-ethyl-3-p-tolyl naphthalene diamine

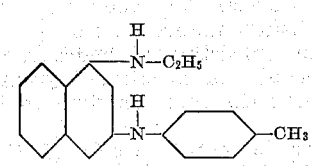

2-propyl-3-p-phenetyl naphthalene diamine

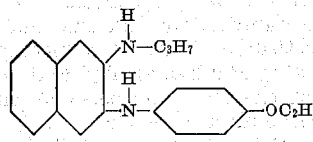

1-p(OH)-phenyl-7-isopropyl naphthalene diamine

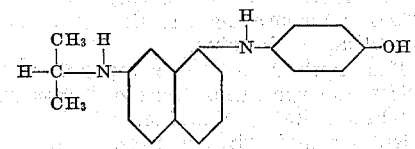

1:5-dibenzyl naphthalene diamine

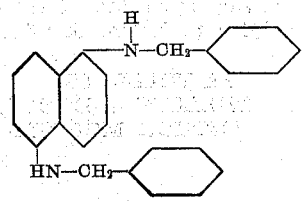

2-benzyl-6-p(OH) phenyl naphthalene diamine

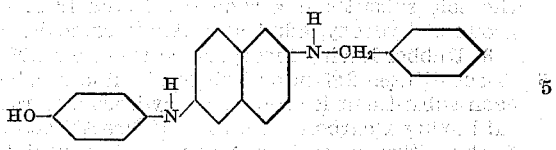

2-b-phenyl-ethyl-7-ethyl naphthalene diamine

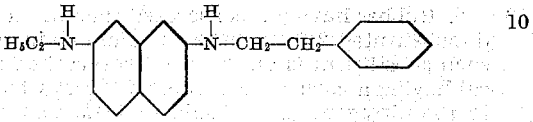

The compounds of our invention are likewise effective when added to the rubber after vulcanization by any of the commonly applied methods of impregnation.

In the examples we disclosed the use of one part of the deterioration inhibitor to 100 parts of the rubber. However the proportion of deterioration inhibitor employed may be varied within rather wide limits, depending upon the desire of the user and the nature of the rubber stock employed.

While we have disclosed compositions containing specific compounds and specific methods of preparing the same, it will be readily apparent that the specific compounds employed and the methods of employing the same may be widely varied without departing from the spirit of our invention. Accordingly, the scope of our invention is to be limited solely by the appended claims construed as broadly as is permissible in view of the prior art.

We claim:

1. The method of preserving rubber which comprises incorporating therein 2-7-diphenyl naphthalene diamine.

2. Rubber having incorporated therein 2-7-diphenyl naphthalene diamine.

3. The method of preserving rubber which comprises incorporating therein an N,N' di-substituted 2:7-naphthalene diamine in which each substituent is a benzene ring having a ring carbon atom thereof directly bonded to the nitrogen, each of said benzene rings containing as the sole substituent a radical selected from the group of hydroxy, alkyl and alkoxy radicals.

4. The method of preserving rubber which comprises incorporating therein an N,N' di-substituted 2:7-naphthalene diamine in which each substituent is an organic hydrocarbon radical having a carbon atom thereof directly bonded to the nitrogen, each of said radicals containing at the most one benzene ring.

5. The method of preserving rubber which comprises incorporating therein an N,N' di-substituted 2:7-naphthalene diamine in which each substituent is an organic hydrocarbon radical having a carbon atom thereof directly bonded to the nitrogen, each of said radicals containing at the most one benzene ring, the radical on one nitrogen being the same as that on the other nitrogen.

6. The method of preserving rubber which comprises incorporating therein an N,N' di-substituted 2:7-naphthalene diamine in which each substituent is an aromatic hydrocarbon radical of the benzene series having a ring carbon atom thereof directly bonded to the nitrogen.

7. Rubber having incorporated therein an N,N' di-substituted 2:7-naphthalene diamine in which each substituent is a benzene ring having a ring carbon atom thereof directly bonded to the nitrogen, each of said benzene rings containing as the sole substituent a radical selected from the group of hydroxy, alkyl and alkoxy radicals.

8. Rubber having incorporated therein an N,N' di-substituted 2:7-naphthalene diamine in which each substituent is an organic hydrocarbon radical having a carbon atom thereof directly bonded to the nitrogen, each of said radicals containing at the most one benzene ring.

9. Rubber having incorporated therein an N,N' di-substituted 2:7-naphthalene diamine in which each substituent is an organic hydrocarbon radical having a carbon atom thereof directly bonded to the nitrogen, each of said radicals containing at the most one benzene ring, the radical on one nitrogen being the same as that on the other nitrogen.

10. Rubber having incorporated therein an N,N' di-substituted 2:7-naphthalene diamine in which each substituent is an aromatic hydrocarbon radical of the benzene series having a ring carbon atom thereof directly bonded to the nitrogen.

11. The method of preserving rubber which comprises incorporating therein an N,N' di-substituted naphthalene diamine in which the nitrogens are attached to different rings of the naphthalene nucleus and in which each substituent is an organic hydrocarbon radical having a carbon atom thereof directly bonded to the nitrogen, each of said organic radicals containing at the most one benzene ring.

12. Rubber having incorporated therein an N,N' di-substituted naphthalene diamine in which the nitrogens are attached to different rings of the naphthalene nucleus and in which each substituent is an organic hydrocarbon radical having a carbon atom thereof directly bonded to the nitrogen, each of said organic radicals containing at the most one benzene ring.

13. The method of preserving rubber which comprises incorporating therein an N,N' di-substituted 2:7-naphthalene diamine in which each N substituted group is a member of the group consisting of alkyl, aralkyl and aryl groups containing at the most one benzene ring and in which substituents are restricted to members of the group consisting of hydroxy, alkyl and alkoxy radicals.

14. The method of preserving rubber which comprises incorporating therein an N,N' di-substituted 2:7-naphthalene diamine in which each N substituted group is a member of the group consisting of alkyl, aralkyl and aryl groups containing at the most one benzene ring and in which substituents are restricted to members of the group consisting of hydroxy, alkyl and alkoxy radicals, the substituted group on one nitrogen being the same as that on the other nitrogen.

15. The method of preserving rubber which comprises incorporating therein an N,N' di-substituted 2:7-naphthalene diamine in which each N substituted group is a member of the group consisting of alkyl, aralkyl and aryl groups containing at the most one benzene ring and in which substituents are restricted to members of the group consisting of hydroxy, alkyl and alkoxy radicals, at least one of said substituted groups being an aryl group.

16. The method of preserving rubber which comprises incorporating therein an N,N' di-substituted 2:7-naphthalene diamine in which each N substituted group is a benzene ring in which substituents are restricted to members of the group consisting of hydroxy, alkyl and alkoxy radicals, the substituted group on one nitrogen being the same as that on the other nitrogen.

17. The method of preserving rubber which comprises incorporating therein an N,N' di-substituted naphthalene diamine in which the nitrogens are attached to different rings of the naphthalene nucleus and in which each N substituted group is a member of the group consisting of alkyl, aralkyl and aryl groups containing at the most one benzene ring and in which substituents are restricted to members of the group consisting of hydroxy, alkyl and alkoxy radicals.

18. Rubber having incorporated therein an N,N' di-substituted 2:7-naphthalene diamine in which each N substituted group is a member of the group consisting of alkyl, aralkyl and aryl groups containing at the most one benzene ring and in which substituents are restricted to members of the group consisting of hydroxy, alkyl and alkoxy radicals.

19. Rubber having incorporated therein an N,N' di-substituted 2:7-naphthalene diamine in which each N substituted group is a member of the group consisting of alkyl, aralkyl and aryl groups containing at the most one benzene ring and in which substituents are restricted to members of the group consisting of hydroxy, alkyl and alkoxy radicals, the substituted group on one nitrogen being the same as that on the other nitrogen.

20. Rubber having incorporated therein an N,N' di-substituted 2:7-naphthalene diamine in which each N substituted group is a member of the group consisting of alkyl, aralkyl and aryl groups containing at the most one benzene ring and in which substituents are restricted to members of the group consisting of hydroxy, alkyl and alkoxy radicals, at least one of said substituted groups being an aryl group.

21. Rubber having incorporated therein an N,N' di-substituted 2:7-naphthalene diamine in which each N substituted group is a benzene ring in which substituents are restricted to members of the group consisting of hydroxy, alkyl and alkoxy radicals, the substituted group on one nitrogen being the same as that on the other nitrogen.

22. Rubber having incorporated therein an N,N' di-substituted naphthalene diamine in which the nitrogens are attached to different rings of the naphthalene nucleus and in which each N substituted group is a member of the group consisting of alkyl, aralkyl and aryl groups containing at the most one benzene ring and in which substituents are restricted to members of the group consisting of hydroxy, alkyl and alkoxy radicals.

23. The method of preserving rubber which comprises incorporating therein 2:7-di-p-phenetyl naphthalene diamine.

24. The method of preserving rubber which comprises incorporating therein 2-m-tolyl-7-o-phenetyl naphthalene diamine.

25. Rubber having incorporated therein 2:7-di-p-phenetyl naphthalene diamine.

26. Rubber having incorporated therein 2-m-tolyl-7-o-phenetyl naphthalene diamine.

IRA WILLIAMS.
WILLIAM A. DOUGLASS.
ARTHUR MORRILL NEAL.

Certificate of Correction

Patent No. 2,116,333.  May 3, 1938.

IRA WILLIAMS ET AL.

It is hereby certified that error appears in the printed specification of the above numbered patent requiring correction as follows: Page 2, second column, lines 20 to 25, strike out the formula and insert instead the following:

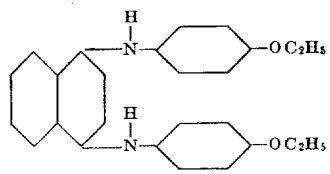

and that the said Letters Patent should be read with this correction therein that the same may conform to the record of the case in the Patent Office.

Signed and sealed this 19th day of July, A. D. 1938.

[SEAL]

HENRY VAN ARSDALE,
*Acting Commissioner of Patents.*